United States Patent [19]

Patzelt et al.

[11] Patent Number: 4,919,691

[45] Date of Patent: Apr. 24, 1990

[54] PAINT DETACKIFICATION USING AN IMPROVED OIL-IN-WATER EMULSION WITH DIBASIC ESTER

[75] Inventors: Robert R. Patzelt, Bloomfield Hills, Mich.; Robert J. Meade, Naperville; Morris Mindick, Downers Grove, both of Ill.

[73] Assignee: Nalco Chemical Company, Naperville, Ill.

[21] Appl. No.: 338,820

[22] Filed: Apr. 17, 1989

[51] Int. Cl.$^5$ .............................................. B01D 21/01
[52] U.S. Cl. .......................................... 55/45; 55/85; 55/89
[58] Field of Search ...................... 55/45, 85; 252/356, 252/358, 364; 134/38; 210/708

[56] References Cited

U.S. PATENT DOCUMENTS

| | | | |
|---|---|---|---|
| 4,168,746 | 9/1979 | Sheely | 436/27 |
| 4,370,174 | 1/1983 | Braithwaite, Jr. | 134/38 |
| 4,378,235 | 3/1983 | Cosper et al. | 55/85 |
| 4,396,405 | 8/1983 | Lindenberger et al. | 55/85 |
| 4,554,026 | 11/1985 | Cosper et al. | 134/38 |
| 4,750,919 | 6/1988 | Patzelt et al. | 55/45 |

*Primary Examiner*—Joseph L. Schofer
*Assistant Examiner*—R. H. Delmendo
*Attorney, Agent, or Firm*—Donald G. Epple; Anthony L. Cupoli

[57] ABSTRACT

In a method of recovering volatile organic paint carrier from paint spray booths and also collecting, detackifying, and dispersing paint solids obtained from paint overspray in said paint spray booths, which paint spray booths are of the type comprising a chamber, a duct system for passing air through said chamber, an exhaust system connected to said duct system, a sump containing a circulating hydrophilic liquid which is pumped onto a means for forming a liquid curtain of said hydrophilic liquid, said liquid curtain being contacted by oversprayed paint and volatile organic paint carrier; the improvement which comprises using as the hydrophilic liquid an improved oil-in-water emulsion maintained at a pH value ranging from 7.5-11.0, which emulsion consists essentially of the ingredients:

(a) from 5-50 weight percent, of an organic hydrocarbonaceous liquid having a boiling point of at least 150° C.;

(b) from 0.5-20 weight percent, based on the organic hydrocarbonaceous liquid of an oil-in-water emulsifier;

(c) from 5-100 weight percent, based on the organic hydrocarbonaceous liquid, of a polar organic solvent, which polar organic solvent has a water solubility of less than 10 weight percent (based on total solution), a vapor pressure less than 0.5 Torr at 20° C., a Tag closed cup flash point of at least 90° C., and is easily admixed with said organic hydrocarbonaceous liquid; and (d) water, the remainder;

and wherein said improved emulsion, or portions thereof, (v) are collected periodically or continuously, (w) broken into separate organic, aqueous, and solid phases by adjusting the pH of the collected portion to a pH of from about 3.0 to about 6.5, and (x) recovering from said aqueous, organic, and solid phases some portion, or all of said paint solids and volatile organic paint carriers; and (y) further recovering said organic hydrocarbonaceous liquid, said polar organic solvent, said emulsifiers and said water, and then;

(z) reforming a recycled improved emulsion by using said recovered organic hydrocarbonaceous liquid, said recovered polar organic solvent, said recovered emulsifiers and water by admixing same and adjusting the pH to a range between 7.5-11.0, and then reusing the recycled improved emulsion as the hydrophilic liquid in the paint spray booth, and then repeating steps v, w, x, y, and z.

6 Claims, No Drawings

PAINT DETACKIFICATION USING AN IMPROVED OIL-IN-WATER EMULSION WITH DIBASIC ESTER

INTRODUCTION

As earlier taught in several references, great quantities of paints of various kinds including lacquers, varnishes, enamels, and certain speciality paints such as the urethane-based paints, catalyzed two-component paints, base coat/clear coat combination paints, high solids enamels or lacquers, and the like are used in the automobile appliance and allied industries to coat finished products. These paints, lacquers and varnishes are generally solvent based, however certain of these paints are water-based. Some are low solids (primarily below about 30-50% solids) and some are high solids (usually above 65-70% solids).

In the use of these coatings or paint materials, the paint of coating is generally sprayed onto the piece to be painted or coated generally in an enclosed area called the paint spray booth. In this operation substantial quantities of solvent and oversprayed paint and paint solids are discharged into the paint spray booth and the air drawn into the booth and hence may be discharged into the atmosphere. As such these oversprayed paint solids and volatile organic carbon solvents represent potential environmental hazards which must be controlled.

Current paint spray booths comprise a chamber, a duct system for passing air through the chamber, a sump containing circulating hydrophilic liquid located in the bottom of the chamber, which liquid is normally pumped into the spray booth chamber to form a curtain of this hydrophilic liquid, which liquid curtain contacts the over sprayed paint particles and volatile organic paint solvents and collects a portion thereof.

These typical spray booth systems have generally operated using water, but more recently have been operated using an oil-in-water emulsion as taught in U.S. Pat. No. 4,378,235, U.S. Pat. No. 4,396,405, U.S. Pat. No. 4,523,932, U.S. Pat. No. 4,563,199, U.S. Pat. No. 4,444,573, U.S. Pat. No. 4,554,026, and U.S. Pat. No. 4,750,919, all of which are incorporated herein by reference.

The paint spray booths generally represent major items of capital expense and as such replacing paint spray booths with more effective mechanical systems which would enable removal of volatile organic carriers as well as the collection detackification and dispersion of oversprayed paint particles, oversprayed paint solids and detackified paint sludges, could be prohibitively expensive. As such, it is important to find methods to modify the existing equipment so that this equipment can recover volatile organic carriers, as well as collect, detackify and recover oversprayed paint particles, solids and sludges, rather than discharge these volatile organic carbon materials and paint solids sludges and the like into the atmosphere or ground waters.

In addition, if one could simultaneously improve the art of using such paint spray booths to include not only collection and disposal of oversprayed paint particles as well as volatile organic carriers one again improves the art.

In addition to the patents cited above, the prior art shows the use of various other liquid fluid materials employed as fluids in the sump of paint spray booths which fluids trap paint particles and which may act as collection liquids for volatile organic carriers. References employing oil-in-water emulsion for example include Japanese Kokai No. 52990 76 and U.S. Pat. No. 4,265,642. In addition there is some indication in U.S. Pat. No. 3,932,151 that such a paint spray booth may operate with mineral oil as the continuously flowing liquid which contacts oversprayed paint.

In all of the references above, with the exception of the last reference mentioned, an oil-in-water emulsion is used which emulsion is basically formed by a high boiling organic liquid oil emulsified in water using an oil-in-water emulsion of various types. Various methods are then taught to use these emulsions for the recovery of organic vapors from the volatile organic components present as paint carriers as well as to collect and detackify oversprayed paint and paint solids.

It would be an advance to the art if a method could be developed which would simultaneously recover volatile organic paint carriers from paint spray booth systems using an economically derived absorbing fluid which simultaneously in the contact and collection of oversprayed paint would detackify and disperse the detackified paint solids even the difficult specialty paints so that they might be easily carried away, collected and the oils used in the emulsions recycled and reused.

It is therefore an object of this invention to provide an improved oil-in-water emulsion useful for both removing volatile organic carriers from paint spray booth systems and particularly useful for contacting, detackifying and collecting oversprayed paint and paint solids, irrespective of the paint formulations or types being used, which emulsion is easily breakable to recover the hydrocarbon phase thereof from which a major portion of volatile organic carriers may or may not be further distilled and recovered; and which emulsion also provides for continued and improved collection, detackification and dispersion of oversprayed paint and oversprayed paint solids which are also easily removed either before or after the emulsion is broken. Normally, after the solids have been removed, it is possible to recover hydrocarbon phases, water phases, and paint solids phases.

A further object of this invention is to provide a method of using the improved oil-in-water emulsions to derive the benefits cited above.

This invention is premised upon the use of an improved oil-in-water emulsion which not only absorbs volatile organic paint carriers from air in paint spray booths, but is also useful to contact, collect, detackify and disperse oversprayed paint and paint solids collected and used in said paint spray booths.

The improved oil-in-water emulsions of this invention can be rapidly broken to yield an oil phase consisting of the organic hydrocarbonaceous liquids used to form the emulsions, volatile organic paint carrier materials absorbed therein, water and whatever solvents might be contained therein, and detackified and dispersed paint solids which may be dispersed in the improved emulsion or in either the aqueous phase or the oil phase after the emulsions broken.

In addition to the usual organic hydrocarbonaceous liquids taught in the prior art, the improved oil-in-water emulsions of the subject invention contain a polar organic solvent which is miscible with the hydrocarbon liquid or which can be substituted in some portion thereof, and which polar organic solvent is essentially insoluble in water. By the term essentially insoluble in water we mean that the polar organic solvent is soluble in water to a degree of less than 10 weight percent, preferably 8.0 weight percent (based on total solution). We also use the terms polar organic solvent and organic polar solvent interchangeably.

The use of these improved oil-in-water emulsions provides for all of the benefits that a normal use of a prior art oil-in-water emulsion provides and in addition provides for improved recovery of paint solids and greatly improved detackification of all paints, including the more difficultly detackified paints such as the urethane based paints, the two component paint systems, and including base coat and clear coat paints, as well as high solids enamels and lacquers. The improved emulsions of this invention also improve the detackification of any other type of paint or coating normally used with a paint spray booth system. These improved emulsions greatly improve the dispersion of the detackified paint and paint solids and permits continued use of the improved emulsions to concentrations of dispersed solids well in excess of 5 weight percent, and even as high as about 10 weight percent or higher of dispersed paint solids (based on total weight of emulsion) in these circulating emulsions in the spray booth.

THE INVENTION

We have discovered a method of recovering volatile organic paint carriers from paint spray booths while simultaneously improving the collection, detackification and dispersion of oversprayed paint solids obtained from paint over spray in these paint spray booths. As earlier stated, these spray booths are of the type comprising a chamber into which the piece to be painted is moved and contacted with a sprayed paint, a duct and fan system for passing air through said chamber to carry away both organic vapors derived from the solvents in this paint as well as oversprayed paint which misses the paint target or piece, said duct system including an exhaust system connected thereto which exhaust system permits the collection and exhaust of air which has contacted the liquid curtain containing a hydrophilic liquid which contacts said air and in turn, contains the volatile organic paint carriers and oversprayed paint and paint particulate matter. The paint spray booth also contains a sump or means for collecting the circulating hydrophilic liquid from which it is pumped onto a means for forming the liquid curtain which accomplishes the goals mentioned above. This liquid curtain is contacted by oversprayed paint and volatile organic paint carriers which provides for the liquid curtain absorbing, collecting and obtaining increased concentrations of volatile organic paint carriers and oversprayed paint and paint particulate matter therein.

Our improved method includes and comprises using as the hydrophilic recirculating liquid an improved oil-in-water emulsion which is maintained at a pH value ranging from about 7.5 to about 10.0 and occasionally as high as about 11.0 which improved emulsions consists essentially of the ingredients:

(a) from 5 to about 50 weight percent of an organic hydrocarbonaceous liquid having a boiling point of at least 150° C.;

(b) from 0.5 to about 20 weight percent, based on the organic hydrocarbonaceous liquid, of an oil-in-water emulsifier;

(c) from about 5–100 weight percent, based on the organic hydrocarbonaceous liquid, of a polar organic solvent, which polar organic solvent has a water solubility of less than 10 weight percent, a vapor pressure less than 0.5 Torr at 20° C., a Tag closed cup flash point of at least 90° C., and which polar organic solvent is easily admixed with said organic hydrocarbonaceous liquid to form a single component fully miscible solution in the portions used; and (d) water, as the remainder.

Furthermore, the water and other ingredients are admixed with sufficient energy to form a stable improved emulsion.

This improved emulsion is used as the circulating hydrophilic liquid in a paint spray booth said improved emulsion or portions thereof being collected periodically or continuously, broken into separate organic, aqueous, and solid phases by adjusting the pH of the collected improved emulsions or portions thereof to a pH ranging from about 3.0 to about 6.5, and recovering from said phases, or perhaps prior to breaking the improved emulsion into phases, some portion or all of said paint solids, volatile organic paint carriers, and other residue, and further recovering, preferably after the removal of the solid phases and volatile organic paint carriers, said organic hydrocarbonaceous liquid, said polar organic solvent and said water and emulsifiers. These materials may be used to reform the improved emulsions.

After the recovery of the organic hydrocarbonaceous liquid, the polar organic solvent and the emulsifiers, the improved emulsion may be reformed by using the recovered water or alternatively by using a fresh water source, and by admixing these ingredients after adjusting the pH to within the original range between 7.5 to 10.0.

The paint spray booths of the type for which this improved emulsion is designed may be of a wet wall design, a center draft design or other construction which provides for the contact of air containing the organic volatile carriers from the paint as well as oversprayed paint and paint particles with the recirculating hydrophilic liquid, which in this invention, is the improved oil-in-water emulsion described above. The hydrophilic fluid serves to trap oversprayed paint particles, serves to trap organic vapors, and also particularly in this case of this new improved emulsion, serves to detackify oversprayed paint and paint solids and disperse the detackified paint solids into the emulsion at concentrations ranging from at least 3 weight percent paint solids to as high as 10 weight percent paint solids and sometimes higher, without obtaining paint pads (insoluble masses) or deposits on the surfaces of the paint booth system.

Before briefly describing the process in which our improved water-in-oil emulsions are utilized, the following explanation is presented for each of the components of the improved oil-in-water emulsions.

The Organic Hydrocarbonaceous Liquid

The organic hydrocarbonaceous liquid component of our improved oil-in-water emulsions should be relatively non-volatile, should be water immiscible and hydrocarbonaceous in nature and further have the character as acting as a solvent for volatile organic paint solvents present in the various paint formulations. Such organic hydrocarbonaceous liquids are primarily aliphatic, paraffinic, aromatic or mixtures thereof. However, these organic hydrocarbonaceous liquids may be halogenated or non-halogenated and should generally have a boiling point greater than 150° C. at atmospheric pressure. The boiling point is preferably greater than 200° C. and most preferably above 300° C. Viscosities of these organic hydrocarbonaceous liquids may range from that of a 100 SEC primarily aliphatic petroleum process oil to that of a highly chlorinated paraffinic material having viscosities in excess of 20,000 centipoise. Therefore, the only critia for materials of this type are those stated above.

Typical materials which can be employed include TELURA ® 323, a process oil manufactured by the Exxon Company, U.S.A. which is categorized as having a boiling point ranging from 545°-884° F., negligible solubility in water, a specific gravity of 0.903 at 60° F., and a Cleveland open cup flash point of 330° F. and a viscosity at 100° F. of 105-115 centipoise. This particular process oil is believed to be a complex mixture of aliphatic and aromatic petroleum hydrocarbons. In addition to various chlorinated paraffinic materials or admixtures thereof with non-halogenated solvents, other hydrocarbon liquids which may be used are Iso-Par M ®, a branched paraffinic material available from the Humble Oil & Refinery Company, LOPS ®, a low odor paraffinic solvent available from Exxon Company, U.S.A., and Marcol 82 ®, a highly aliphatic viscous oil available from the Exxon Company, U.S.A.

Substantial variations in organic hydrocarbon liquids or organic hydrocarbonaceous liquids may be used in this improved invention without varying the spirit or intent of this improvement. As an example 10 or even 20 weight motor oil may be satisfactorily employed.

The Oil in Water Emulsifiers

The oil-in-water emulsifiers used in this invention preferably have a HLB value ranging from about 6 to 40 and most preferably ranging from about 10-30. The oil-in-water emulsifiers employed should provide when mixed with the organic hydrocarbonaceous liquid and water an oil-in-water emulsion which can be rapidly broken through chemical or physical action, or combinations thereof. For example, the emulsion formed may be broken by pH change or other means to provide a relatively distinct hydrocarbon phase and a distinct aqueous phase. The oil-in-water emulsifiers selected should also allow rapid reformation of the improved oil-in-water emulsions from the component parts thereof. Emulsifiers which may be employed in this invention include water-soluble or dispersible anionic, cationic and nonionic materials meeting the other requirements above.

The preferred emulsifiers for use in this invention are saturated and unsaturated fatty acids, the alkaline metal salts thereof, or mixtures of these acids and salts. These fatty acids contain from 12-30 and preferably 16-24 carbon atoms. These preferred emulsifiers form the improved emulsions and easily break the emulsion into its hydrophilic and hydrophobic component parts when made acidic. These component parts also easily reform with mild mixing the improved emulsions of this invention when the pH is adjusted back to a range from between 7.5-10. This mixing may be provided merely by pumping the component parts through, for example, a reciprocating pump.

It is also expected that water-in-oil emulsifiers other than those specifically enumerated herein may be employed and it may also be anticipated that certain stabilizers or combination of emulsifiers may be used with this invention. An especially preferred emulsifier for the use in these improved emulsions is oleic acid, the alkali salts or quaternary amine salts of oleic acid or any admixture of oleic acid, its salts or admixtures thereof. Although various classes of surfactants may be used, we have found that nonionic surfactants when employed by themselves in this invention produce an emulsion which is not pH sensitive and therefore does not permit adjustment and formation of emulsion component parts merely by modifying the pH. While these nonionic surfactants may be employed in the invention it is common to employ them with either an anionic or a cationic cosurfactant.

In forming the improved emulsions of the invention, the preferred fatty acid emulsifying agent as well as some of the other mentioned emulsifying agents, generally fatty amines and the like, provide for pH sensitive emulsions which may be broken into their component parts by merely adjusting the pH. The preferred emulsions using oleic acid and its salts are generally formed and are stable at pH values ranging from about 7.5 to about 11, but the emulsions are preferably between a pH ranging between about 7.5 and about 9.5. Likewise, the preferred improved emulsions of this invention are rapidly broken when the pH is adjusted below about 6.5, but this emulsion breaking is accomplished preferably in the range between about 3.0 and 6.5 and most preferably in the range between about 4.0 and 6. This pH adjustment can be made by any number of various acidic acids including both organic and inorganic acids or salts.

As taught in the art, this pH sensitivity of emulsions in general, and also of these improved emulsions lead to great utility in the recovery of both volatile and non-volatile organic paint carriers as well as oversprayed paint solids which are detackified by contact with the improved emulsions in the paint spray booth system.

The Polar Organic Solvents

The polar organic solvents of the improved emulsions have a water-solubility of less than 10 weight percent, a vapor pressure of less than about 0.5 Torr at 20° C.; a Tag closed cup flash point of at least 90° C., and preferably of at least 94° C., and may be easily miscible or immiscible with the organic carbon carbonaceous liquids described above. Preferably, the polar organic solvents are miscible with the organic hydrocarbonaceous liquids.

These polar organic solvents are preferably chosen from the group consisting of dialkyl diesters of dibasic acids or mixtures thereof, having the structure:

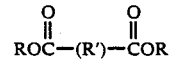

wherein R is chosen independently, at each occurrence from linear or branched alkyl groups containing from 1-6 carbon atoms, preferably from 1-4 carbon atoms, R is most preferably chosen independently at each occurrence from methyl, ethyl, propyl, and isopropyl alkyl groups.

R' is a linear or branched alkylene group containing from 2-12 carbon atoms, preferably containing from 2-8 carbon atoms and most perferably between 2-6 carbon atoms. R' is primarily linear methylene repeating units containing between 2-8 carbon atoms.

These dialkyl dibasic acids are particularly exemplified by polar organic solvents chosen from the group consisting of dimethyl adipate, dimethyl glutarate, dimethyl succinate, and mixtures thereof. These materials are available from the DuPont de Nemours Company and are described in a brochure from that company entitled "DuPont Dibasic Esters (DBE), Solvents and Intermediates for Industry", which brochure is incorporated herein by reference. Several examples of these DBE's are available commercially and can include dimethyl adipate, dimethyl glutarate, and dimethyl succinate in various purities or admixed in various concentrations ranging from about 15-90 weight percent dimethyl adipate, 10-99 weight percent dimethyl glutarates, and 0.5 to 99 weight percent dimethyl succinates, and various admixtures thereof. In most of the actual experiments presented in this disclosure, a mixture of these dibasic esters was used which contained from about 15 to 20 weight percent dimethyl adipate, about 60 to about 70 weight percent dimethyl glutarates, and about 15-20 weight percent weight percent dimethyl succinates have been used.

Each of the dimethyl adipate, dimethyl glutarate, and dimethyl succinate diesters have a vapor pressure at 20° C. of between about 0.06 to about 0.3 Torr. These materials are soluble in water between about 4 to about 7.5 weight percent, and the Tag closed cup flash point for each of these materials or admixtures thereof range from about 94 to about 107° C.

The polar organic solvents of the improved emulsions of this invention are used at from about 5 to about 100 weight percent based on the organic hydrocarbonaceous liquid. In other words from 5 to about 100 weight percent of the organic hydrocarbonaceous liquid is replaced with the polar organic solvent. Preferably the polar organic solvent is used by replacing from about 10 to about 50 weight percent of the hydrocarbonaceous liquid and most preferably it is used by replacing from about 10 to about 35 weight percent of the organic hydrocarbonaceous liquid.

A particularly preferred improved emulsion contains between about 2.5 to about 7.5 weight percent (based on total emulsion) of an admixture of dimethyl glutarate, dimethyl adipate and dimethyl succinate, from about 15-30 weight percent (based on total emulsion) of a 100 second primarily aliphatic process oil, from about 1-5 weight percent of oleic acid, and from about 57.5 to 81.5 weight percent water, which emulsion is pH adjusted to be within the range of about 7.5 to about 11.0, and preferably between about 7.5 to about 9.5 pH.

The improved emulsions of our invention can also contain between about 10-40 weight percent of the organic hydrocarbonaceous liquid, between about 1-10 weight percent, based on organic hydrocarbonaceous liquid, of an oil-in-water emulsifier, from about 10-35 weight percent based on organic hydrocarbonaceous liquid, of the polar organic solvent, and the remainder is water. The pH sensitivity, as it relates to breaking the emulsions into component parts and remaking, of these improved emulsions which contain the polar organic solvent are similar to the pH sensitives of the emulsions known in the art, but the use of these improved emulsions greatly improves the ability of the improved emulsion to detackify, collect and disperse oversprayed paint and paint solids while simultaneously collecting volatile organic paint carriers. It is preferred to avoid the extremes of pH in making, using or remaking these improved emulsions, particularly when the DBEs are used as the polar organic solvents.

Water

The water used in the improved oil-in-water emulsions must be similar in quality to the water used in the art, as described particularly in U.S. Pat. No. 4,378,235, previously incorporated herein by reference. It is stated therein that the water should be free of excessive hardness particularly when the preferred fatty acid emulsifiers are used in the formulations of the improved emulsions. If hard water, i.e. water containing, for example, dissolved calcuim and/or magnesium salts, is encountered, chelating agents such as NTA and/or EDTA may be added to the water on a 1:1 molar basis to combat the effectiveness of the hardness in forming salts with the fatty acid emulsifiers.

The emulsions are generally formed by following the formulations given above and simply admixing the ingredients together. When using the fatty acid emulsifiers pH values of from 7.5 to about 10 and preferably from about 7.5 to about 9.5 are used. Most preferably the emulsions will have a make-up pH ranging from about 7.5 to about 9.0 to about 9.5. Due to the potential hydrolysis of the dibasic esters which are preferred as the polar organic solvents, it is advisable to maintain the pH of the improved emulsions below about 9.5 and preferably below about 9.0. Simultaneously, when breaking the improved emulsion to recover detackified paint solids and organic overspray in terms of volatile and non-volatile components, the pH should preferably be between 3 to about 6.5, most preferably between about 4 to about 6.5 and can range from a pH from about 5 to about 6.5. Again operating with minimal pH swings can improved recovery of the dibasic esters by avoiding the hydrolysis of these materials, either at high pH's or at low pH's.

To exemplify the results of using the improved emulsions of this invention, the following examples are given.

EXAMPLE 1

An improved emulsion having the following formulation:

TABLE I

| Ingredient | Improved Emulsion Weight Percent | Comments |
|---|---|---|
| DBE** | 5-6 | Color, Gardner, Scale. Max 1 |
| 100 SEC Process Oil | 21-23 | |
| Oleic Acid | 1.5-2.5 | |
| Water | 68.5-72.5 | |

*pH was adjusted by adding caustic solution to about 8.0-8.5
**Admixture containing 10-25 wt. % dimethyl adipate, 55-75 wt. % dimethyl glutarate, and 25-25 wt. % dimethyl succinate was substituted in a plant previously using an oil-in-water emulsion without the polar organic solvents of this invention. Prior use of these oil-in-water emulsions which did not contain the organic polar solvents led to collection of spent emulsions which contained only about 1-2 volume percent suspended paint solids. These spent emulsions were collected and held in a pit prior to pH adjustment, phase separation and collection of dispersed and detackified paint. It was found by using the old emulsion that the paint solids could not be dispersed above about 1-2 volume percent of the emulsion without forming paint deposits within the paint spray booth.

sump and pumping systems and causing the collection of only partially detackified paint solids in the bottom of the collection pit.

Previous use of these old emulsions required at least 4-5 days to clean up and pump from this holding pit this spent emulsion using a vacuum truck, required 18 laborers, and cost approximately $100,000. Obviously, the spent emulsions were viscous and difficult to handle. Treatment to remove suspended solids and recover organic liquids and solids and paint sludges required about 4 months. The sludge formed was only partially detackified and the amount of paint solids collected were minimized to between 1-2 weight percent, based on spent emulsion weight.

The improved emulsion described in Table I was added to the paint spray booth system in place of the old oil-in-water emulsion. After 2-4 days of operation, these improved emulsions picked up approximately 5 to 7 volume percent total detackified paint solids, remained considerably less viscous and therefore were more pumpable, and when collected in the spent emulsion pit, required only 1 day to remove therefrom using a simple singular pump, required only 4 men to do so, and cost approximately $20,000. The recovery of the paint sludges thereafter required less than 3 days after pH adjustment to separate the phases, remove the paint solids recover the organic hydrocarbonaceous liquid, the polar organic solvents and emulsifiers, and to re-form and remake the improved emulsion ready for recycle and reuse.

In addition to improving the collection dispersion and detackification of paint solids, it was noted that improved collection of organic vapors in the paint spray booth was obtained.

EXAMPLE 2

Approximately one-half dozen paint spray booths operating in and around the midwest have been switched over to the improved oil-in-water emulsions of this invention. In so doing, greatly improved operations have been observed, particularly as it involves the collection, detackification and dispersion of oversprayed paint and paint solids in these improved emulsions. When using these improved emulsions, the dispersed and detackified paints in the spent emulsions can exist in a fluid condition up to and including at least 10 volume percent of dispersed and detackified paint solids in the recirculating hydrophilic liquid which forms the liquid curtain in the paint spray booths in which these improved emulsions are being used. Not only do we observe the improved detackification and dispersion of oversprayed paint and paint particulates, but other observations are also made when these improved emulsions are substituted for the emulsions of the prior art. These observations are as follows:

(1) Solids concentrations in the bulk solutions of the improved emulsions using particularly the dibasic esters (DBEs) described above can be as much as 9-10 times higher than the solids concentrations obtained with the original prior art emulsion. This is particularly true when a two-component paint is used. Generally, the use of these two-component paints, particularly two-component clear coats, provide difficulties when using the prior art oil-in-water emulsions. However, by modifying these emulsions by including the polar organic solvents of the instant invention, it is possible to operate the improved emulsions with a solids content as high as 9 volume percent. This decreases down-time and permits the collection of more paint solids with considerably less emulsion.

(2) The improved emulsions have a lower viscosity than the original emulsion, particularly after the emulsion has been used to capture oversprayed paint and paint particles. For example, the viscosity of the prior art spent emulsion contained in the overflow pit cited above, and only containing from 1-2 weight percent paint solids, range between about 12-15 seconds as measured with a Zahn No. 3 cup. However improved emulsion containing a mixture of DBEs was used as described above, the spent emulsion contained nearly five times the amount of paint solids and still maintained a viscosity, as measured in a Zahn No. 3 cup, ranging between about 10-12 seconds.

(3) At certain sites using the prior art emulsion, after extended operation, which included periodic removal and replacement of the old emulsion, the pit-collected spent emulsion would thicken to Zahn No. 3 viscosities ranging upwards of 45 seconds or more at a pH between about 7.5 and about 8.5. Mere addition of about two weight percent of the DBEs based on oil phase of the old emulsion reduced the viscosity from about 45 seconds to about 12 seconds, as measured in a Zahn No. 3 cup.

(4) Results from the field testing cited above have demonstrated that the emulsions improved by incorporating the polar organic solvents, particularly the various DBEs and mixtures thereof, produce a less cohesive, less tacky, more recoverable paint sludge which is more readily dispersed in the improved emulsion, and which dispersion has better rheological properties permitting the emulsion containing higher amounts of paint sludges to flow better, therefore becoming easier to pump to remove by vacuum truck. Additionally these dispersed solids/sludges are far less adhesive to wetted metal surfaces of the spray booth holding pit, or subsequently used equipment.

EXAMPLE 3

In bench tests conducted with a two-component prime paint, this two-component paint formulaton was not soluble in a prior art oil-in-water emulsion. The paint collected in this prior art emulsion continued to cure while dispersed in the emulsion, resulting in the formation of hard pads of cured and partially cured paint suspended in and collected on the emulsion surface, as well as deposited on certain metal parts of the containers. Mere addition of more surfactant and emulsifier failed to correct this difficulty. Adjustment of pH to higher values initially dispersed these two-component prime and urethane paint solids, but resulted in the formation of a hard pad, which deposited on the bottom of the container. As a result, the conclusion had to be reached that the oil-in-water emulsions of the prior art would fail to prevent this type of two-component prime and urethane paint system from curing, and would result in the formation of hard deposits floating in the spray booth sumps and in the back sections of the spray booth and also leading to the formation of layers of hard paint pads on most of the wetted metal surfaces.

By use of the improved emulsions of this invention, particularly that emulsion which contained approximately 6 weight percent, based on the total weight of the emulsion, or about 15-20 weight percent, based on the organic hydrocarbonaceous liquid, of the DBE admixture of dimethyl esters cited above led to complete detackification and dispersion of paint solids derived from these two-component paints, elimination of the formation of the hard pads of cured paint, either on the surface of the improved emulsions, or on the metal surfaces wetted by these emulsions, and particularly permitted, both before and after breaking these emulsions by pH adjustment, the collection of a pumpable paint solid sludge which contained sufficient BTU value to be burned experimentally in a waste fuel program. In fact, the ash obtained by this burning was of sufficient quality to be used as cement or concrete filler, which use was accomplished.

The use of 20% (based on organic hydrocarbonaceous liquid) of the admixture of dibasic esters referred to above also gave an excellent acid break at a pH ranging between about 4.0–6.5 and allowed for the recovery of detackified paint solids, oil, DBE and emulsifier phases and water phases.

EXAMPLE 4

When used to detackify two-component urethane-based clear coats at a commercial site, these improved emulsions led to an increase in suspended paint solids in the improved emulsion from about 1–2 volume percent, as observed in the old emulsions, to about 9–10 volume percent. Paint pad deposits on metal surfaces in back sections of the spray booth disappeared during the trial of this improved emulsion. However, it was noted that the impoved emulsion has a finite capacity to detackify these two-component clear coat urethane based paints, which capacity appears to be related to the content in the improved emulsion of the dibasic ester. However, this capacity is greatly improved over the original oil-in-water emulsions and can be taken care of by replacing the spent improved emulsions with fresh improved emulsion derived from recycle as taught above. This replacement is far less frequent than that required with the prior art emulsions used in this two-component application.

Having described our invention, we claim:

1. In a method of recovering volatile organic paint carrier from paint spray booths and also collecting, detackifying, and dispersing paint solids obtained from paint overspray in said paint spray booths, which paint spray booths are of the type comprising a chamber, a duct system for passing air through said chamber, an exhaust system connected to said duct system, a sump containing a circulating hydrophilic liquid which is pumped onto a means for forming a liquid curtain of said hydrophilic liquid, said liquid curtain being contacted by oversprayed paint and volatile organic paint carrier; the improvement which comprises using as the hydrophilic liquid an improved oil-in-water emulsion maintained at a pH value ranging from 7.5–11.0, which emulsion consists essentially of the ingredients:
   (a) from 5–50 weight percent of an organic hydrocarbonaceous liquid having a boiling point of at least 150° C.;
   (b) from 0.5–20 weight percent, based on the organic hydrocarbonaceous liquid of an oil-in-water emulsifier;
   (c) from 5–100 weight percent, based on the organic hydrocarbonaceous liquid, of a polar organic solvent, which polar organic solvent has a water solubility of less than 10 weight percent (based on total solution), a vapor pressure less than 0.5 Torr at 20° C., a Tag closed cup flash point of at least 90° C., and is easily admixed with said organic hydrocarbonaceous liquid; and
   (d) water, the remainder;
   and wherein said improved emulsion, or portions thereof, (v) are collected periodically or continuously, (w) broken into separate organic, aqueous, and solid phases by adjusting the pH of the collected portion to a pH of from about 3.0 to about 6.5, and (x) recovering from said aqueous, organic, and solid phases some portion, or all of said paint solids and volatile organic paint carriers; and (y) further recovering said organic hydrocarbonaceous liquid, said polar organic solvent, said emulsifiers and said water, and then;
   (z) reforming a recycled improved emulsion by using said recovered organic hydrocarbonaceous liquid, said recovered polar organic solvent, said recovered emulsifiers and water by admixing same and adjusting the pH to a range between 7.5–11.0, and then reusing the recycled improved emulsion as the hydrophilic liquid in the paint spray booth, and then repeating steps v, w, x, y, and z.

2. In the method of claim 1, the use of an improved emulsion which consists essentially of the ingredients:
   (a) from 10–40 weight percent of an organic hydrocarbonaceous liquid having a boiling point of at least 200° C.;
   (b) from 1.0–10.0 weight percent, based on the organic hydrocarbonaceous liquid of an oil-in-water emulsifier;
   (c) from 10–35 weight percent, based on the hydrocarbonaceous liquid, of a polar organic solvent chosen from dialkyl diesters of dibasic acids, or mixtures thereof, having the structure:

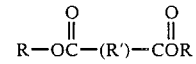

wherein:
   R is, independently, at each location, chosen from linear or branched alkyl groups containing from 1–6 carbon atoms,
   R' is a linear or branched alkylene group containing from 2–12 carbon atoms;
   (d) water, the remainder.

3. In the method of claim 1, the use of an improved emulsion consisting essentially of the ingredients:
   (a) from 10–40 weight percent of an organic hydrocarbonaceous liquid having a boiling point of at least 300° C.;
   (b) from 1.5–10.0 weight percent, based on organic hydrocarbonaceous liquid of an oil-in-water emulsifier chosen from the group consisting of $C_{12}$–$C_{30}$ saturated or unsaturated fatty acids, and mixtures thereof;
   (c) from 10–35 weight percent, based on organic hydrocarbonaceous liquid of a polar organic solvent chosen from the group consisting of dimethyl adipate, dimethyl glutarate, dimethyl succinate, and mixtures thereof; and
   (d) the remainder, water.

4. In the method of claim 3, the use of an improved emulsion consisting essentially of the ingredients:
   (a) from 20–40 weight percent of a 100 SEC aliphatic process oil having a boiling point of at least 300 degrees C.;
   (b) from 1.5–10.0 weight percent, based on the 100 SEC oil, of an oil-in-water emulsifier chosen from the group consisting of oleic acid, its salts, or mixtures thereof;

(c) from 10–30 weight percent, based on the 100 SEC oil, of a polar organic solvent chosen from the group consisting of dimethyl adipate, dimethyl glutarate, dimethyl succinate, and mixtures thereof; and (d) water, the remainder.

5. The method of claim 1 wherein the improved emulsion consists essentially of the ingredients:
(a) from 10–40 weight percent of a 100 SEC aliphatic process oil having a boiling point of at least 300° C.;
(b) from 1.5–10.0 weight percent, based on the 100 SEC oil, of an oil-in-water emulsifier chosen from the group consisting of oleic acid, its salts, or mixtures thereof;
(c) from 10–30 weight percent, based on the 100 SEC oil, of a polar organic solvent chosen from the group consisting of dimethyl adipate, dimethyl glutarate, dimethyl succinate, and mixtures thereof; and
(d) water, the remainder;
and wherein the improved emulsion has a pH ranging from about 7.5 to about 10.0 and is broken into its separate phases at a pH ranging from 4.0–6.5, and further wherein the water used to remake the improved emulsion prior to recycle and reuse is fresh water.

6. The method of claims 1, 2, 3, 4, or 5, wherein the detackified paint solids recovered from the improved emulsion are burned and the ash derived from this combustion is used as cement or concrete filler.

* * * * *